United States Patent [19]

Taylor et al.

[11] Patent Number: 4,628,728
[45] Date of Patent: Dec. 16, 1986

[54] METHOD FOR MEASURING THE VOLUMETRIC CAPACITY OF ANILOX ROLLS

[75] Inventors: Jefferson H. Taylor; Eugene L. Green, Sr., both of Dallas, Tex.

[73] Assignee: Wilson Engraving Company, Inc., Dallas, Tex.

[21] Appl. No.: 831,611

[22] Filed: Feb. 21, 1986

[51] Int. Cl.$^4$ ............................................. G01F 17/00
[52] U.S. Cl. ..................................................... 73/149
[58] Field of Search ................. 73/149, 432 G, 432 R

[56] References Cited

U.S. PATENT DOCUMENTS

| | | | |
|---|---|---|---|
| 3,204,446 | 9/1965 | Cooke | 73/149 X |
| 3,487,682 | 1/1970 | Whitehead, Jr. | 73/149 |
| 3,755,659 | 8/1973 | Bolhuis | 73/432 G X |
| 4,347,749 | 9/1982 | Heintze | 73/864.51 X |

FOREIGN PATENT DOCUMENTS

| | | | |
|---|---|---|---|
| 65621 | 5/1980 | Japan | 73/149 |
| 643745 | 1/1979 | U.S.S.R. | 73/432 G |

*Primary Examiner*—Michael J. Tokar
*Assistant Examiner*—Tom Noland
*Attorney, Agent, or Firm*—Glaser, Griggs & Schwartz

[57] ABSTRACT

A method for determining the volumetric capacity of a fluid metering roller is disclosed. A measured amount of ink is deposited onto the transfer surface of the roller and is then dispersed into the underlying cells. A sheet of low-absorbancy transfer material is spread over the roller and the ink deposit lying in the interface between the roller transfer surface and the impression sheet is spread by the application of a roller or scraper across the back side of the transfer paper. The engraved cells are filled by the excess ink as it spreads across the cell transfer surface. The area of the transfer paper impression is measured by overlaying the impression area with a transparent sheet of graph paper having grid lines of known spacing. The known quantity of ink deposited upon the transfer surface (in billions of cubic microns) is then divided by the measured area of the transfer impression (in square inches) with the quotient being the volumetric capacity of the roller in billions of cubic microns per square inch.

9 Claims, 10 Drawing Figures

METHOD FOR MEASURING THE VOLUMETRIC CAPACITY OF ANILOX ROLLS

FIELD OF THE INVENTION

This invention relates generally to the measurement of volumetric capacity, and in particular to a method for determining the volumetric capacity of a fluid metering roller of the type commonly used in the printing industry.

BACKGROUND OF THE INVENTION

Fluid metering or transfer rollers, commonly referred to as "anilox rollers", are used in the printing industry to transfer measured amounts of printing ink onto printing plates. The surface of anilox rollers is engraved with an array of closely spaced, shallow depressions referred to as "cells". Ink is absorbed into the cells from fountain rollers turning within an ink bath. The transfer surface of the anilox roller is scraped with a doctor blade to remove excess ink. The ink remaining on the anilox roller is that contained within the cells. The plate cylinder transfers ink picked up from the anilox roller to a web of material, either plastic or paper, onto which the desired image is imprinted.

The anilox roller is cylindrical and may be constructed in various diameters and lengths, containing cells of various sizes and shapes. The volumetric capacity of an anilox roller is established during manufacturing and is dependent upon the selection of cell size, shape and number of cells per unit area. Depending upon the intended application, the cell pattern may be fine (many small cells per square inch) or coarse (fewer larger cells per squarre inch). Anilox rollers having high cell density are used for high-quality printing and rollers having the largest cells are used in non-printing applications such as the application of glue or paint.

DESCRIPTION OF THE PRIOR ART

The volumetric capacity of an anilox roller is specified as a combination of metric and English units (billions of cubic microns per square inch). Rollers vary from one billion cubic microns per square inch to more than 500 billion cubic microns per square inch.

In a printing operation, the anilox roller bears against the printing plate during ink transfer with the result that surface wear occurs and the volumetric capacity of the roller is reduced. Because of this surface wear, it is desirable to accurately determine the volumetric capacity of the roller from time-to-time to maintain print quality. Since the cell structure of most anilox rollers is too small to be resolved by the naked eye, a metallurgical microscope is usually required for cell inspection and evaluation.

Previous attempts to determine the capacity of the anilox roller by making measurements with a metallurgical microscope have not been totally satisfactory. The microscope may be used for direct examination of the transfer cell structure, or indirectly by examination of a molded replica of the cell structure. In either case, calculation of cell volume requires tedious mathematical manipulation of formulae which are often inexact. Different formulae are required for different geometries and some cell structures are so complex that they defy a close approximation of their volume. Ceramic rolls, which have irregular cells, are also difficult to measure and conventional calculations of such irregular cell capacity are virtually meaningless.

The decrease in cell volume caused by wear can sometimes be compensated by changing the ink formulation. After surface wear has occurred to such an extent that compensation cannot be obtained by changing the ink formulation, the worn roller is sometimes used on less critical applications. Eventually, volumetric capacity is reduced to such an extent that the anilox roller must be removed from service and refinished with a new engraved transfer surface. Moreover, when trouble-shooting a printing problem, the trouble may sometimes be caused by one or more sources, e.g., the paper, the ink formulation, roller synchronization, or the wear condition of the anilox roller. At such times, there is a need to quickly verify the volumetric capacity of the anilox roller so that its condition can be ruled out as a possible cause of the printing problem. It is generally desirable to measure the volumetric capacity of the anilox roller periodically and assess its wear rate, thereby establishing an estimated replacement date.

SUMMARY OF THE INVENTION

The measurement method of the present invention utilizes a basic characteristic of the anilox roller, that is, the ability to carry or absorb a specific amount of ink per unit surface area. Utilization of this technique is essentially opposite in nature to the use of the roller in printing. That is, in the method of the present invention, a measured amount of ink is deposited onto the surface of the anilox roller and then the transfer area that the measured amount of ink will cover is determined. The ink is dispensed from a precision micro pipette directly onto the surface of the anilox roller. A sheet of transfer material having low absorbancy is then spread over the roller and the ink deposit lying between the anilox roller and the transfer sheet is spread by the application of a scraper blade across the backside of the transfer paper. The engraved cells are filled by the excess ink as it is spread across the cell transfer surface.

Upon completion of spreading the ink deposit, the transfer paper is carefully removed and is allowed to dry. The area of the transfer paper impression is then measured by overlaying the impression area with a transparent sheet of graph paper having suitable grid lines. The known quantity of ink deposited upon the roller (in billions of cubic microns) is then divided by the measured area of the transfer impression (in square inches), with the quotient being the volumetric capacity of the roller in billions of cubic microns per square inch.

The novel features which characterize the invention are defined by the appended claims. The foregoing advantages and features of the invention will hereinafter appear, and for purposes of illustration of the invention, but not of limitation, an exemplary embodiment of the invention is shown in the appended drawings.

DESCRIPTION OF THE PREFERRED EMBODIMENT

Figure 1:
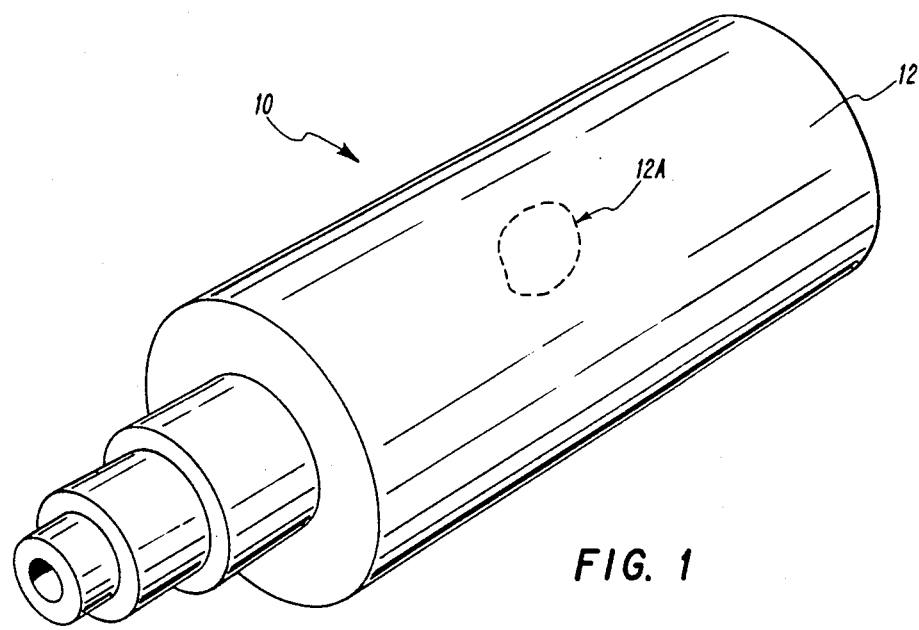
FIG. 1 is a perspective view of an anilox roller having an engraved transfer surface.

In the description which follows, like parts are indicated throughout the specification and drawings with the same reference numerals, respectively.

Referring now to the drawings, the preferred method of the invention provides an accurate measurement of the volumetric capacity of a fluid metering or transfer roller 10, commonly referred to as an anilox roller, which is used extensively in the flexographic printing trade to transfer closely controlled quantities of ink from fountain rollers running in an ink bath to a printing plate roller or cylinder. The transfer surface 12 of the anilox roller 10 is engraved to produce tiny depressions or cells 14 which generally cover the surface of the anilox roller, with the aggregate volume of the cells defining a reservoir from which ink is transferred onto the printing plate roller.

Figure 2:
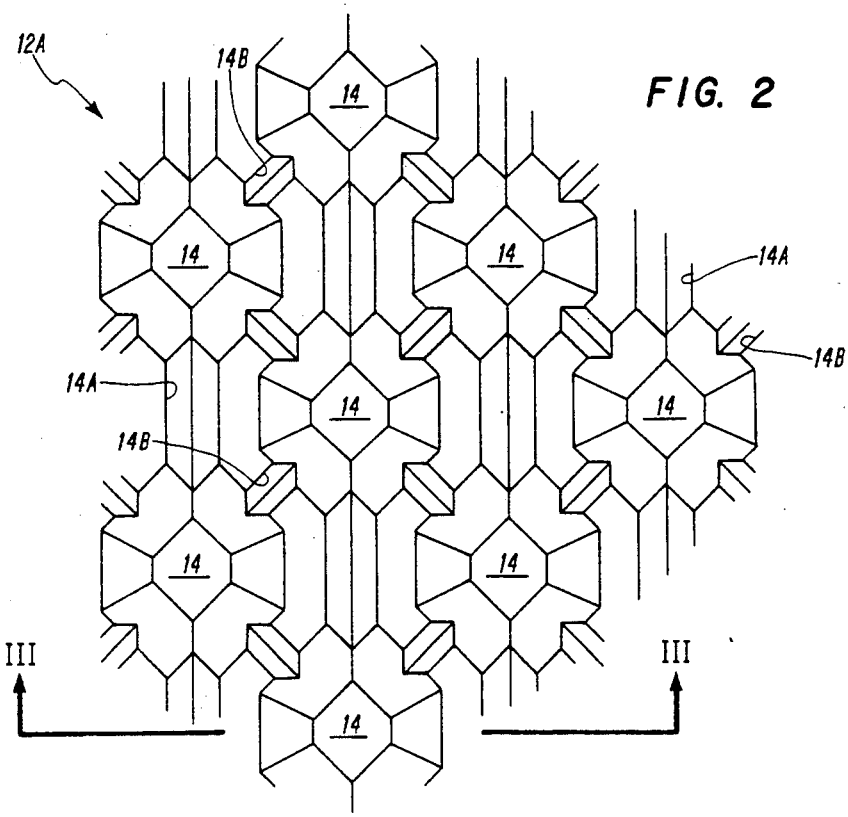
FIG. 2 is an enlarged view of the engraved cells which are formed upon the transfer surface of the anilox roller of FIG. 1.

The cell configuration as illustrated in FIG. 2 is hexagonal, with adjacent cells being interconnected by channels 14A, 14B. The channels 14A, 14B provide an escape for air which prevents cavitation and reduces the resistance to filling of the cell and also eliminates the suction effect as the transfer surface is applied to the printing plate, thereby promoting smooth lay-down and uniform ink distribution.

Figure 3:
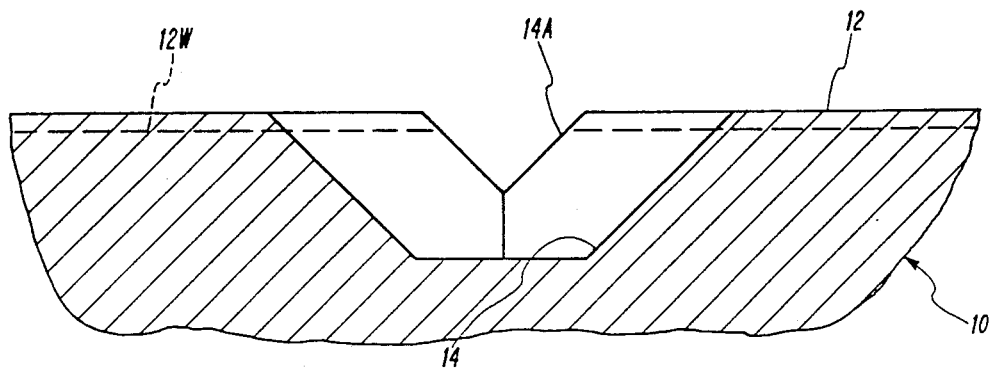
FIG. 3 is a sectional view of a typical cell taken along the line III—III of FIG. 2.

As the anilox roller 10 is used, the transfer surface 12 wears away as indicated by the dashed line 12W in FIG. 3. Because such wear substantially reduces the cell capacity, it is desirable to accurately determine the volumetric capacity of the roller transfer surface from time-to-time.

According to the method of the present invention, a roller transfer surface 12A is selected for the determination of volumetric capacity. Usually, only one test per roller is required, since the anilox rollers tend to wear uniformly. Thus the specific location of the selected transfer surface 12A is arbitrary. The selected transfer site 12A is thoroughly cleaned to remove accumulated ink deposits.

After the selected transfer site has been cleaned, a measured volume 16 of specially prepared ink is deposited onto the cleaned transfer surface 12A. The ink is preferably prepared from a high-quality, oil-base, flat black paint which has been thinned with acetone. Acetone is preferred as the thinning agent because it yields a fine-grained medium which is quick drying. A small amount of boiled linseed oil is added to the mixture to somewhat retard the drying time so that the ink does not dry before it is fully spread over the transfer surface. While various ink formulations may be used to good advantage, it is important that the ink not dry too quickly, to permit substantially complete dispersion of the ink deposit.

Figure 4A:
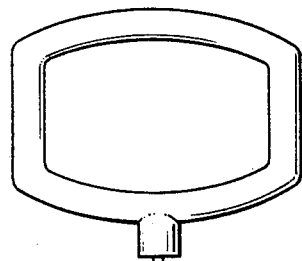
FIG. 4A is a front elevational view of a precision micro pipette.
Figure 4B:
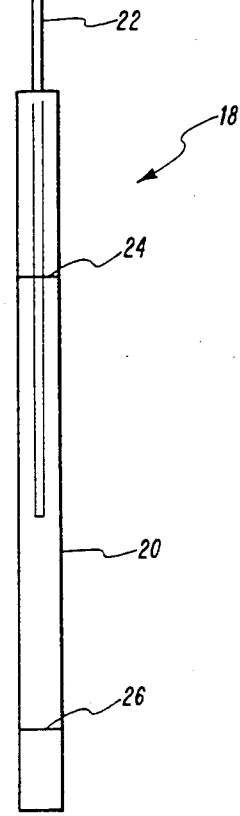
FIG. 4B is an enlarged view of an end portion of the pipette shown in FIG. 4A.

The ink deposit 16 is dispensed in a known measured amount by a calibrated micro pipette 18 as illustrated in FIGS. 4A and 4B. The micro pipette is a capillary tube 20 in which a plunger 22 is received. A calibrated volume line 24 and a liquid level immersion line 26 are marked onto the sidewall of the capillary tube. The micro pipette is filled by dipping its lower end 20A into a volume of ink and drawing a measured quantity of ink into its capillary bore 20B by retracting the plunger 22 until the ink level coincides with the calibrated volume marking 24. The micro pipette 18 of the present example has a calibration marking 24 which corresponds with 25 microliters (25 billion cubic microns). Micro pipettes are available in volume capacities of 5, 10, 20, 25, 50 and 100 microliters. The micro pipette delivers its charge to within one percent of its rated volume.

Figure 5:
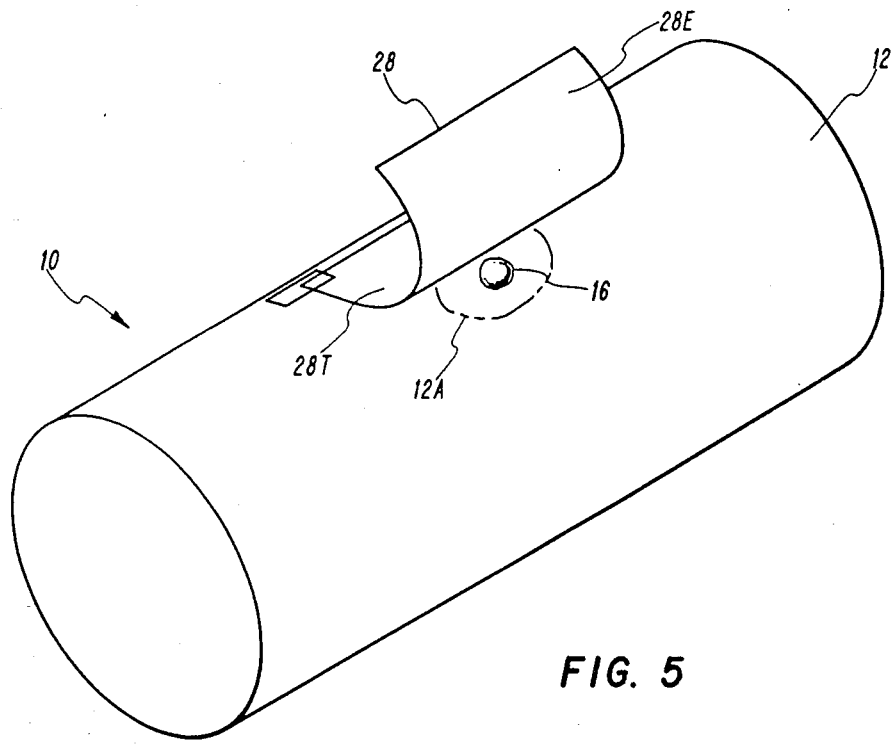
FIG. 5 is a simplified perspective view of an anilox roller which illustrates the deposit step of the present invention.
Figure 6:
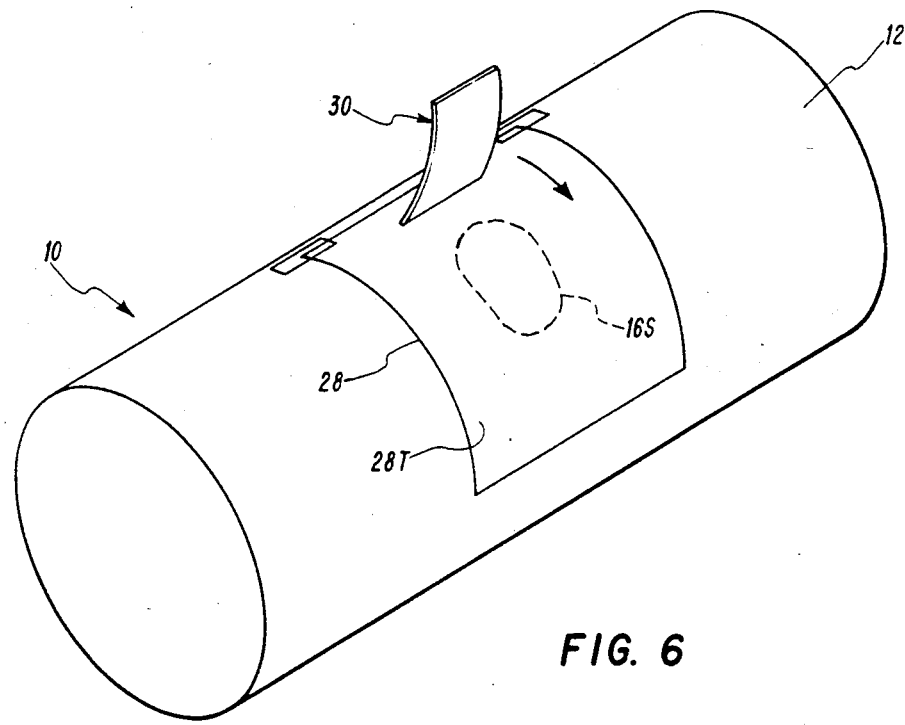
FIG. 6 is a simplified perspective view similar to FIG. 5 which illustrates the spreading transfer step of the invention.

Referring now to FIGS. 5 and 6, after the micro pipette 18 has been charged with a known volume of ink, it is substantially centered over the cleaned transfer area 12A. The plunger 22 is extended through the capillary bore 20B, which deposits a small droplet 16 of ink onto the prepared surface.

The ink deposit 16 is then dispersed into the cells of the transfer surface 12A. According to one aspect of the invention, the dispersing step is performed by drawing the deposit 16 across the transfer surface with the edge of a blade or other squeegee instrument. According to another aspect of the invention, the dispersing step is performed by spreading the deposit 16 across the transfer surface 12A with a non-absorbant roller, for example a smooth ceramic roller.

The area of the spread deposit is next determined. If an electronic scanner is available, the spread deposit area 16S can be measured directly on the surface of the anilox roller. After the area of the spread deposit has been determined, it is divided into the known volume of the deposit to yield the volumetric capacity of the anilox roller in billions of cubic microns per square inch.

According to the preferred method of the present invention, the area of the spread deposit 16S is determined indirectly by producing an impression 16T of the spread deposit by contacting the spread deposit with a low-absorbancy transfer sheet 28. Plastic sheet materials are preferred for the impression sheet 28. A non-absorbant mylar paper sheet may be used to good advantage. The amount of ink soaked up by the mylar napp is negligible. The impression sheet preferably is thin plastic material with one side 28E having an etched treatment. The etched side 28E captures enough ink so that a high-contrast image 16T of the ink-filled area is produced, but will absorb only an insignificant amount of ink as the deposit 16 is spread.

The impression sheet 28 is taped onto the transfer surface 12 and is then carefully positioned over the measured ink deposit 16. After the impression sheet has been correctly positioned, it is pressed against the deposit 16 to cause the deposit 16 to migrate through the interface between the prepared transfer surface 12A and the etched side 28E of the impression sheet.

According to one aspect of the invention, the pressing step is performed by scraping the external surface 28T of the impression sheet with a squeegee instrument 30. According to another aspect of the invention, the pressing step is performed by applying a rolling force against the external surface 28T with a cylindrical roller. Upon completion of the dispersed ink deposit 16S, the image transfer sheet 28 is carefully removed to prevent smearing of the impression, and is allowed to dry.

The drying time of the preferred ink agent is approximately three minutes.

Figure 7:
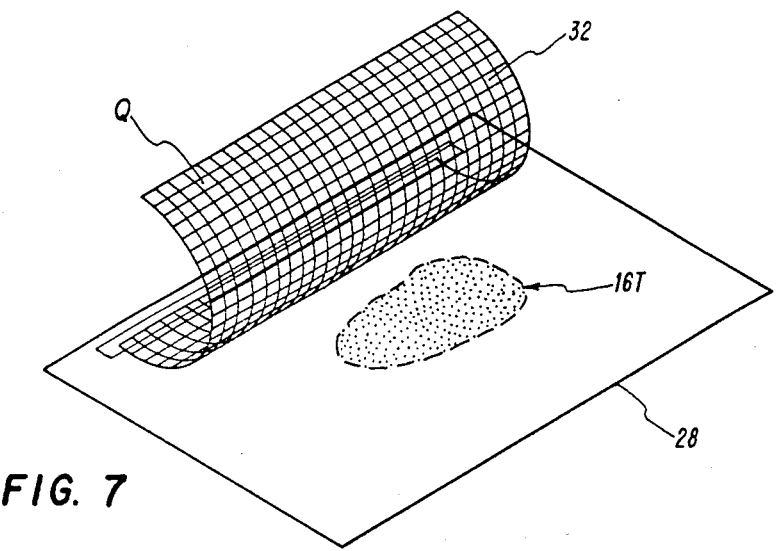
FIGS. 7 and 8 are perspective and top plan views, respectively, which illustrate the grid measurement method of the present invention; and, FIG. 9 is a top plan view of an enlarged portion of the grid overlay shown in FIG. 8.
Figure 8:
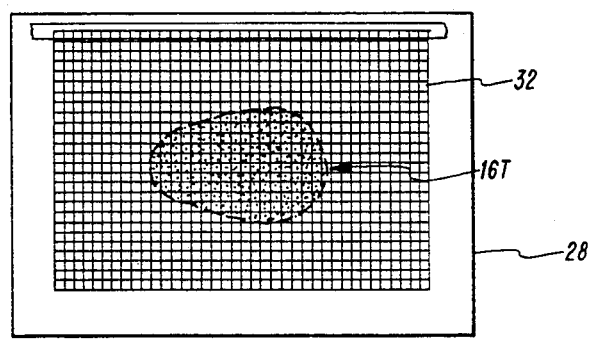
Figure 9:
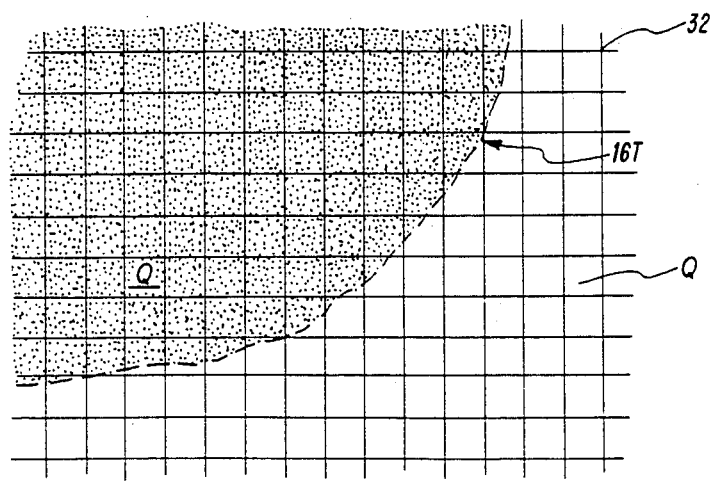

Referring now to FIGS. 7, 8 and 9, the area of the dispersed deposit impression 16T is measured by overlaying the impression sheet 28 with a transparent grid sheet 32 having measuring squares Q per unit area. In the present example, a sheet of engineering graph paper having 20 lines per inch (400 squares Q per square inch) is utilized. The total number of inked squares Q divided by 400 yields the impression area 16T in square inches.

The transparent grid sheet 32 is taped onto the impression sheet 28 as shown in FIG. 8. A total count of the number of measuring squares Q which are coincident with the transfer sheet impression area 16T is then determined. Referring to the enlarged view shown in FIG. 9, it will be noted that some measuring squares Q are not completely filled. An accurate determination of impression area is provided by ignoring any measuring cell Q which is less than one half filled, and by giving full count to each measuring square Q which is filled 50% or more.

While total accuracy is difficult to determine since most calculated values of volumetric capacity are inexact, the values obtained using the method of the present invention agree well with calculated values within plus or minus three percent. Repeatability of measurement appears to be within plus or minus two percent. In comparison, conventional optical measurements provide variations up to 10% and are characterized by poor repeatability.

It will be appreciated that there is a large range of anilox roll volumetric capacities. Accordingly, different volumes of ink may be required. For example, the volumetric capacity of commercially available anilox rolls varies in the range of 1.0 (very fine) to 300 (coarse) cubic microns per square inch.

While plastic sheet material is preferred for producing the dispersed impression 16T, some paper materials which have been specially treated to be non-absorbant may be used to good advantage. In this regard, it is not necessary to pick up all of the ink, only enough to produce a high-contrast impression 16T.

Although the invention has been described with reference to a preferred method, and with reference to a specific fluid metering roller, the foregoing description is not intended to be construed in a limiting sense. Various modifications of the disclosed method as well as alternative applications of the invention will be suggested to persons skilled in the art by the foregoing specification and illustrations. For example, the method of the present invention can be used to good advantage for comparing the finishes of highly polished surfaces. It is therefore contemplated that the appended claims will cover any such modifications or embodiments that fall within the true scope of the invention.

What is claimed is:

1. A method for measuring the volumetric capacity of a transfer roller of the type having spaced cells formed in a transfer surface comprising the steps:
   depositing a known volume of a liquid agent onto the transfer surface;
   dispersing the liquid agent deposit into the cells of the transfer surface;
   measuring the area of the spread deposit; and,
   dividing the known volume of said deposit by the measured area.

2. A method for measuring the volumetric capacity of a transfer roller as defined in claim 1, wherein the dispersing step is performed by drawing the deposit across the transfer surface with the edge of a blade.

3. A method for measuring the volumetric capacity of a transfer roller as defined in claim 1, wherein the dispersing step is performed by spreading the deposit across the transfer surface with a non-absorbant roller.

4. A method for measuring the volumetric capacity of a transfer roller as defined in claim 1, including the steps of:
   producing an impression of the spread deposit by contacting the spread deposit with a transfer sheet; and,
   wherein the area of the spread deposit is determined by measuring the area of the transfer sheet impression.

5. A method for measuring the volumetric capacity of a transfer roller as defined in claim 4, wherein the transfer sheet impression area measurement is performed by:
   overlaying the impression sheet with a transparent sheet on which a grid having a number of measuring squares per unit area is formed; and,
   counting the number of measuring squares which are coincident with the transfer sheet impression area.

6. A method for measuring the volumetric capacity of a transfer roller as defined in claim 1, said dispersing step being performed by:
   overlaying the liquid agent deposit with a sheet of low-absorbancy material; and,
   pressing the low-absorbancy sheet against the deposit to cause the liquid agent deposit to migrate through the interface between the transfer surface and the low-absorbancy sheet.

7. A method for measuring the volumetric capacity of a transfer roller as defined in claim 6, said pressing step being performed by scraping the external surface of said low-absorbancy sheet with a blade.

8. A method for measuring the volumetric capacity of a transfer roller as defined in claim 6, said pressing step being performed by applying a rolling force against the external surface of said low-absorbancy sheet.

9. A method for measuring the volumetric capacity of a transfer roller as defined in claim 1, wherein said deposit is dispensed from a calibrated pipette.

* * * * *